United States Patent [19]
Leineweber et al.

[11] Patent Number: 4,638,719
[45] Date of Patent: Jan. 27, 1987

[54] UNBALANCED HYDRAULIC AMPLIFIER VALVE ASSEMBLY

[75] Inventors: Günter Leineweber; Rolf Warnecke, both of Gifhorn; Heinz Rühmer, Wolfenbüttel, all of Fed. Rep. of Germany

[73] Assignee: Volkswagenwerk Aktiengesellschaft, Wolfsburg, Fed. Rep. of Germany

[21] Appl. No.: 792,833

[22] Filed: Oct. 30, 1985

[30] Foreign Application Priority Data

Nov. 5, 1984 [DE] Fed. Rep. of Germany ....... 3440292

[51] Int. Cl.$^4$ .............................................. F15B 9/10
[52] U.S. Cl. ....................................... 91/373; 91/377; 91/378; 251/175
[58] Field of Search ...................... 91/373, 374, 376 R, 91/378, 377; 60/547.1, 548; 251/175

[56] References Cited

U.S. PATENT DOCUMENTS

| 4,359,869 | 11/1982 | Ideta | 91/378 X |
| 4,379,423 | 4/1983 | Leineweber et al. | 91/373 |
| 4,468,927 | 9/1984 | Farr | 91/378 X |
| 4,516,470 | 5/1985 | Warnecke et al. | 91/374 |

*Primary Examiner*—Robert E. Garrett
*Assistant Examiner*—Mark A. Williamson
*Attorney, Agent, or Firm*—Spencer & Frank

[57] ABSTRACT

A pressure-unbalanced hydraulic amplifier valve assembly has an axially slidable amplifier piston and a control plunger axially slidably arranged in the amplifier piston with a loose fit to permit a slight radial movement thereof in the amplifier piston. For providing a tight seal in the zone of control ports arranged in the amplifier piston, the control plunger is urged in that zone radially against the amplifier piston by a transverse piston continuously exposed to the system pressure. A pressure piston engages one end of the control plunger and is exposed to an external force (such as a braking force applied by a pedal) for axially displacing the control plunger. In order to eliminate undesired axial force components from the force applied by the transverse piston, a force-transmitting ball contacts the transverse piston and an inner wall of the control plunger forming a throughgoing axial bore and constituting an axially linear track for the ball. In order to eliminate undesired transverse force components from the force exerted by the pressure piston on the control plunger, these two components contact one another by means of mutually transversely arranged pins which are solely in a point contact with one another.

4 Claims, 1 Drawing Figure

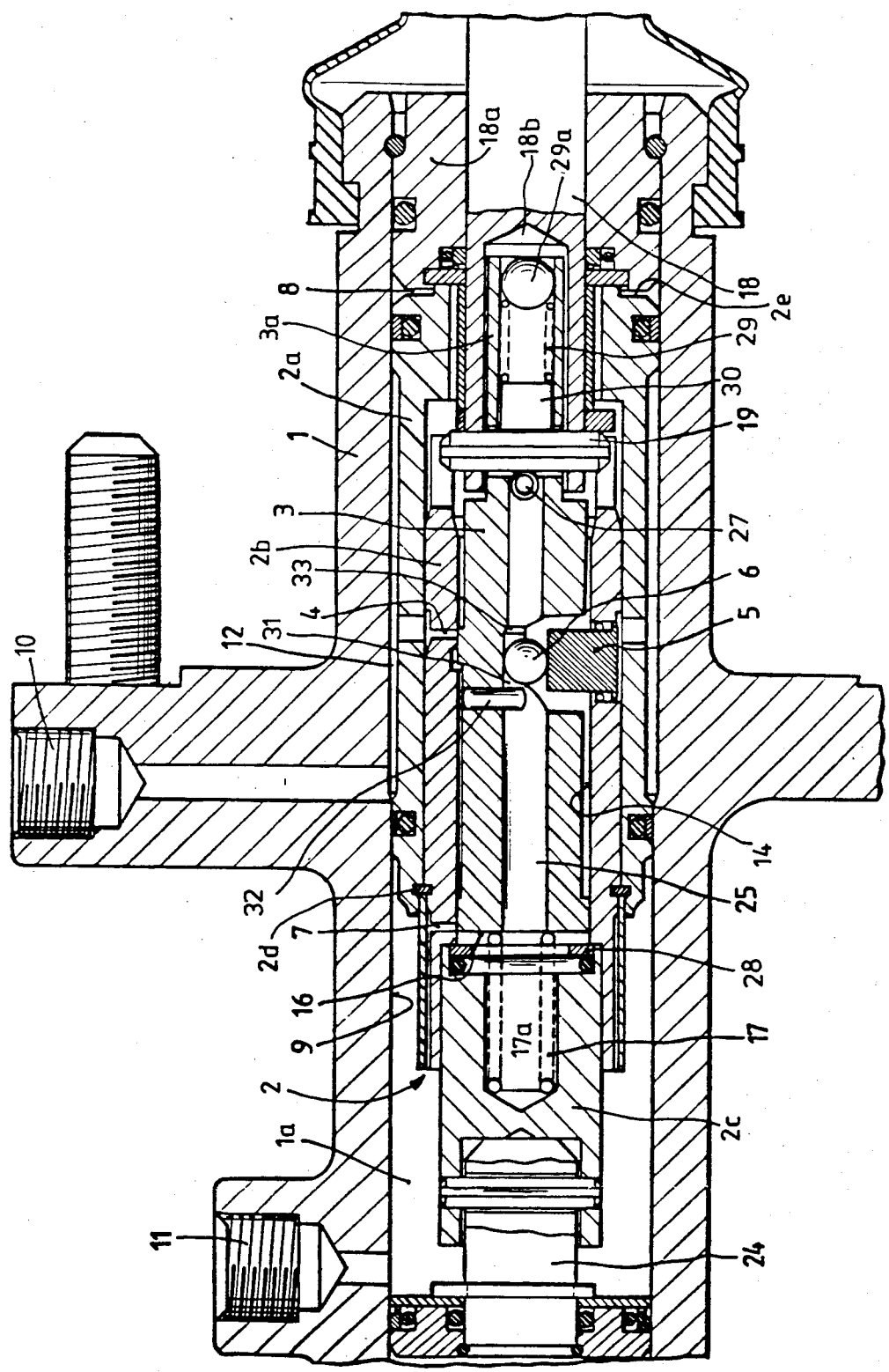

UNBALANCED HYDRAULIC AMPLIFIER VALVE ASSEMBLY

BACKGROUND OF THE INVENTION

This invention relates to an unbalanced hydraulic amplifier valve assembly which is particularly adapted for use in brake systems for automotive vehicles and which is of the type described in U.S. Pat. No. 4,516,470 to Warnecke et al, issued May 14, 1985, whose contents are incorporated herein by reference.

It is known that a determined fit is needed between coaxially arranged, axially relatively movable sliding elements of hydraulic valve assemblies, particularly hydraulic amplifier valve assemblies. In order to reduce the work input involved in the machining of parts to ensure such a fit, without adversely affecting the control or amplifying functions of the valve assembly, U.S. Pat. No. 4,379,423 Leineweber et al, issued on Apr. 12, 1983 discloses the provision of coaxially arranged slide elements such as an amplifier piston and a control plunger, as an unbalanced unit. By virtue of a loose fit, the control plunger may, to a certain extent—which is very small relative to its axial displaceability—move radially within the amplifier piston and the control ports in the latter are asymmetrically arranged, relative to its circumference. These known unbalanced hydraulic amplifier valve assemblies have been found to be useful in practice.

In order to eliminate, in the mobility of the above-outlined known unbalanced hydraulic valve assemblies, a certain degree of tightness which is caused by ring seals provided between an amplifier piston and a control plunger received therein, the above-noted U.S. Pat. No. 4,516,470 discloses an arrangement in which the axially displaceable and radially movable control plunger is supported in the axial passage of the amplifier piston without the use of axial ring seals and the control plunger is pressed against the inner wall of the surrounding amplifier piston by a transverse piston energized by the working pressure (system pressure) of the valve assembly. The radially oriented force of the transverse piston is applied to the control plunger in the zone of a control port which is provided in the amplifier piston and which is asymmetrical relative to the circumference of the control plunger or the amplifier piston. Despite the omission of ring seals on either side of the control ports and despite the coarse (loose) fits between the control plunger and the amplifier piston, the above-outlined arrangement provides for a reliable and highly hermetic seal when the control ports are closed.

SUMMARY OF THE INVENTION

It is an object of the invention to provide an improved unbalanced hydraulic amplifier valve assembly to further ameliorate its regulating behavior and its operational characteristics.

These objects and others to become apparent as the specification progresses, are accomplished by the invention, according to which, briefly stated, the pressure-unbalanced hydraulic amplifier valve assembly has an axially slidable amplifier piston and a control plunger axially slidably arranged in the amplifier piston with a loose fit to permit a slight radial movement thereof in the amplifier piston. For providing a tight seal in the zone of control ports arranged in the amplifier piston, the control plunger is urged in that zone radially against the amplifier piston by a transverse piston continuously exposed to the system pressure. A pressure piston engages one end of the control plunger and is exposed to an external force (such as a braking force applied by a pedal) for axially displacing the control plunger. In order to eliminate undesired axial force components from the force applied by the transverse piston, a force-transmitting ball contacts the transverse piston and an inner wall of the control plunger forming a throughgoing axial bore and constituting an axially linear track for the ball. In order to eliminate undesired transverse force components from the force exerted by the pressure piston on the control plunger, these two components contact one another by means of mutually transversely arranged pins which are solely in a point contact with one another.

By utilizing, according to the invention, a ball member to effect transverse tensioning of the control plunger in the amplifier piston, the regulating behavior of the valve assembly is appreciably improved since the hysteresis of the actuating force is reduced because the ball member, during the operation of the amplifier, ensures strictly constant as well as position-independent and component-independent force conditions. In particular, no axial force components are transmitted to the control plunger, contrary to known arrangements where the transverse piston applies its force on the control plunger with the intermediary of an elongated transverse pin whose two spherical ends engage respective dish-shaped supports of the control plunger and the transverse piston.

By virtue of the use, according to the invention, of two pins which are arranged transversely with respect to one another and which thus have only a point contact, for coupling the brake pedal-side end of the control plunger and the pressure piston there is achieved a further amelioration of the regulating behavior when braking pressure is applied, because even in case of relatively large misalignments (caused, for example, by manufacturing errors) between the control plunger and the pressure piston, no centering effects appear and thus also, no undefined transverse forces are exerted on the control plunger. In known valve assemblies the control plunger and the pressure piston are force-transmittingly connected to one another by the cooperation of a pin supported in the pressure piston, with an edge face which forms part of the control plunger. The edge face extends transversely to the pin and, determined by the manufacturing process, has a circular contour as viewed in the longitudinal direction of the pin. This arrangement generates, at least in case of larger-than-average alignment errors, appreciable centering effects and thus gives rise to transverse forces to which the control plunger is exposed and which adversely affect the regulating behavior of the valve assembly.

BRIEF DESCRIPTION OF THE DRAWING

The sole FIGURE is an axial sectional view of a preferred embodiment of the invention.

DESCRIPTION OF THE PREFERRED EMBODIMENT

Turning now to the FIGURE, there is illustrated an unbalanced hydraulic amplifier valve assembly according to the invention, particularly adapted for use as a braking force amplifier in a hydraulic brake system of an automotive vehicle.

The hydraulic amplifier valve assembly comprises in essence a valve housing 1 which has a throughgoing open-ended axial bore 9 in which there is axially displaceably received an amplifier piston 2 formed of an outer sleeve 2a, an inner sleeve 2b and a piston base member 2c press-fitted into a tubular terminus of the inner sleeve 2b. The outer and inner sleeves 2a, 2b are coaxially affixed to one another by a snap ring 2d. A control plunger 3 is received in an axial bore 14 of the inner sleeve 2b of the amplifier piston 2. A pressure piston 18 functioning as a reaction piston axially adjoins the amplifier piston 2 for exerting on the control plunger 3 a leftward oriented braking force applied by a foot pedal assembly (not shown). The pressure piston 18 is supported for axial displacement in a closure plug 18a. The control plunger 3 is contacted at its left face by a coil spring 17 which is arranged in an axial blind bore 17a of the piston base member 2c. The spring 17 opposes the leftward directed braking force exerted on the control plunger 3 by the pressure piston 18.

The pressure piston 18 is coupled with the adjoining end of the control plunger 3 by means of two pins 19 and 27 which are oriented transversely to one another and which thus are only in a point contact with one another. The pin 19 is supported in the pressure piston 18 whereas the pin 27 is carried by the control plunger 3. By means of such a pin connection there is obtained an omni-directional motion equalization between the control plunger 3 and the pressure piston 18 so that even in case of relatively large alignment errors or off center displacement between the control plunger 3 and the pressure piston 18, no appreciable transverse forces can be exerted by the pressure piston 18 on the control plunger 3. This arrangement has advantages not only as far as operation is concerned but also in the manufacturing process because the requirements concerning precise fits of the mutually cooperating structural elements may be less stringent.

The pins 19 and 27 are urged towards one another by means of a spring device 29 which is arranged in a terminal sleeve portion 3a of the control plunger 3. The terminal sleeve portion 3a, in turn, is received in a blind bore 18b of the pressure piston 18. The spring 29 is seated on a spring seat ball 29a received in the terminal sleeve 3a. Between the other end of the spring 29 and the pin 19 there is situated a cylindrical insert 30 whose opposite radial faces engage the end of the spring 29 and the lateral surface of the pin 19, respectively.

The control plunger 3 and the amplifier piston 2 constitute a pressure-unbalanced unit known by itself. The control plunger 3 fits loosely into the inner sleeve 2b of the amplifier piston 2, permitting a radial displacement of the control plunger 3 within the amplifier piston 2 to a very small extent relative to the length of the axial displacement paths. Further, control ports 4 and 7 provided in the inner sleeve 2b are situated asymmetrically with respect to the circumference of the components 2 and 3. The control port 4, dependent upon the axial position of the control plunger 3, controls fluid admission from a pressure chamber 12 (being in continuous communication with the pressure conduit 10) to a work chamber 8 bounded by a radial annular end face 2e of the outer sleeve 2a of the amplifier piston 2. The control port 7 is in continuous communication with a return conduit 11 with the intermediary of a return chamber 1a.

The control plunger 3 is supported in the amplifier piston 2 in a known manner without axial ring seals on either side of the control ports 4 and 7 so that a particularly low-friction and easily slidable arrangement is obtained. In order to nevertheless ensure the desired highly hermetic seal of the control ports in their closed position, there is provided a transverse piston 5 which is continuously exposed to the system pressure in the pressure chamber 12 as will be described below and which is supported in the wall of the amplifier piston 2 and arranged for radial displacement. The transverse piston 5 shifts the control plunger 3 radially in such a manner that in the zone of the control ports 4 and 7 the control plunger is transversely pressed against the inner wall of the inner sleeve 2b of the amplifier piston 2 so that in an appropriate position of the control plunger 3 with respect to the amplifier piston 2, that is, when the respective control port has just been closed, such transverse pressing of the control plunger 3 effects a highly hermetic and reliable seal.

The transverse piston 5 is coupled in a force-transmitting manner with the control plunger 3 by a ball 6 which may roll on a track 31 which is linear in the axial direction. The track 31 forms a portion of the throughgoing axial bore 25 of the control plunger 3. The rolling path of the ball 6 is limited on the one side by a pin 32 supported in the control plunger 3 and projecting radially into the axial bore 25 and, on the other side, by a constriction of the diameter of the axial bore 25 thus providing an axial abutment 33.

That piston face of the transverse piston 5 which is oriented away from the ball 6 is continuously exposed to the system pressure prevailing in the annular pressure chamber 12 of the amplifier piston 2 so that the transverse piston 5 continuously exerts, through the ball 6, a radially oriented force on the control plunger 3. The magnitude of the radial force may be adapted to the requirements of the valve assembly by accordingly dimensioning the effective surfaces (for example, the area of the radial piston face oriented towards the pressure chamber 12) in a simple manner.

It is readily seen that the ball 6 which may roll on the track 31 and also on the planar face of the transverse piston 5 can transmit only purely radial forces on the control plunger 3, with the exclusion of any axial forces. As compared to known arrangements, where the transverse piston may, under certain conditions, transmit axial force components on the control plunger, in the arrangement according to the invention there results a very small hysteresis of the actuating force and thus there is achieved an appreciably ameliorated regulating behavior.

In order to improve the operational characteristics of the valve assembly in the upper force range, in the axial bore 14 of the amplifier piston 2 there is provided an elastic axial abutment 28 which is thus engaged in a soft contact by the free end of the control plunger 3 (functioning as a control edge for the control port 7) after the control port 4 is fully opened and thus the entire system pressure is prevailing in the work chamber 8, whereby full amplification is present. In this manner there is obtained in the amplifier characteristic curve $P = f(F)$ a soft transition for the range in which the control port 4 is fully opened. P is the output force delivered by the amplifier piston 2, for example, by means of a force transmitting assembly 24 attached to the base member 2c, to a hydraulic master cylinder (not shown) and F is the input force applied to the pressure piston 18 by the pedal assembly (also not shown).

By using two mutually transversely oriented, radially extending pins 19 and 27 to couple the control plunger 3 and the pressure piston 18 to one another in the pressing (force exerting) direction it is possible to advantageously provide the axial passage 25 in the control plunger 3 as a throughgoing, although stepped bore. This has not been possible in prior art arrangements because of the linear edge component cooperating with the pin 19. The throughgoing axial bore 25 provides the additional advantage that the blind bore 18a of the pressure piston 18, receiving the terminus 3a of the control plunger 3 is depressurized in a simple manner, thereby further ameliorating the regulating behavior of the amplifier valve assembly.

It will be understood that the above description of the present invention is susceptible to various modifications, changes and adaptations, and the same are intended to be comprehended within the meaning and range of equivalents of the appended claims.

What is claimed is:

1. In a pressure-unbalanced hydraulic amplifier valve assembly including a housing provided with a housing bore having a longitudinal axis; an amplifier piston axially slidably received in said housing bore and having an axially extending piston bore; means for maintaining a hydraulic system pressure in one part of said housing bore; means defining a control port in said amplifier piston; said control port being asymmetrical relative to a circumference of said amplifier piston; a control plunger axially slidably received in said piston bore with a sufficiently loose fit to provide for a slight radial excursion of said control plunger relative to said amplifier piston; said control plunger being arranged for cooperating with said control port; a transverse piston supported in said amplifier piston for sliding motions radially relative to said axis; said transverse piston being exposed to said system pressure; a first force-transmitting means being in engagement with said transverse piston and said control plunger for pressing said control plunger, in a zone of said control port, radially against said amplifier piston; a pressure piston axially slidably supported in said housing axially adjacent said control plunger; said pressure piston being arranged for exposure to an external axial force oriented towards said control plunger; and a second force-transmitting means for applying said external axial force from said pressure piston to said control plunger; the improvement wherein said control plunger has an inner wall defining a throughgoing axial plunger bore including an axially linear track; said first force-transmitting means comprising a ball being in contact with said transverse piston and with said track and being arranged for rolling engagement with said track; said second force-transmitting means comprising a first pin held in said pressure piston and a second pin held in said control plunger adjacent said first pin; said first and second pins being oriented transversely to one another and being in a substantially point-contact with one another; a spring means for urging said first and second pins into contact with one another; said spring means having first and second ends; and an insert placed between said first pin and said first end of said spring; said insert having a planar end face being oriented towards and in contact with said first end of said spring means; said second end of said spring being supported by said control plunger.

2. A pressure-unbalanced hydraulic amplifier valve assembly as defined in claim 1, wherein said control plunger has a free end remote from said pressure piston; further comprising an elastic abutment supported in said piston bore adjacent said free end; said elastic abutment being arranged for cooperating with said free end to determine an axial limit position for said control plunger into which the control plunger is displaced in response to the external axial force.

3. A pressure-unbalanced hydraulic amplifier valve assembly as defined in claim 1, wherein said insert is a cylindrical member having opposite planar end faces oriented radially relative to said axis; one of said planar end faces of said cylindrical member being oriented towards and in contact with said first end of said spring means and the other of said planar end faces of said cylindrical member being oriented towards and in contact with said first pin.

4. A pressure-unbalanced hydraulic amplifier valve assembly as defined in claim 3, wherein said pressure piston has an open axial bore and said control plunger has a sleeve-like axial terminus received in the open axial bore of said pressure piston; said spring means and said cylindrical member being accommodated in said sleeve-like terminus of said control plunger.

* * * * *